United States Patent
Zhang et al.

(10) Patent No.: US 11,949,945 B2
(45) Date of Patent: Apr. 2, 2024

(54) DYNAMIC CREATION OF LOW LATENCY VIDEO STREAMS IN A LIVE EVENT

(71) Applicant: Brightcove, Inc., Boston, MA (US)

(72) Inventors: Bo Zhang, Boston, MA (US); Yuriy Reznik, Seattle, WA (US)

(73) Assignee: Brightcove Inc., Boston, MA (US)

( * ) Notice: Subject to any disclaimer, the term of this patent is extended or adjusted under 35 U.S.C. 154(b) by 0 days.

(21) Appl. No.: 17/942,909

(22) Filed: Sep. 12, 2022

(65) Prior Publication Data

US 2023/0107615 A1  Apr. 6, 2023

Related U.S. Application Data

(60) Provisional application No. 63/261,094, filed on Sep. 10, 2021.

(51) Int. Cl.
| | |
|---|---|
| H04N 21/438 | (2011.01) |
| H04L 67/02 | (2022.01) |
| H04N 21/4402 | (2011.01) |
| H04N 21/845 | (2011.01) |

(52) U.S. Cl.
CPC ......... *H04N 21/4384* (2013.01); *H04L 67/02* (2013.01); *H04N 21/4402* (2013.01); *H04N 21/8456* (2013.01)

(58) Field of Classification Search
CPC ........... H04N 21/4384; H04N 21/4402; H04N 21/8456; H04N 21/234309; H04N 21/2358; H04N 21/26258; H04N 21/2187; H04L 67/02; H04L 65/61; H04L 65/765; H04L 65/65; H04L 65/80
See application file for complete search history.

(56) References Cited

U.S. PATENT DOCUMENTS

2017/0257408 A1   9/2017  Gaunt et al.

*Primary Examiner* — Anthony Bantamoi
(74) *Attorney, Agent, or Firm* — MUGHAL GAUDRY & FRANKLIN PC

(57) ABSTRACT

A method for creating a low latency DASH (LL-DASH) video stream from a Low latency HLS video stream (LL-HLS) is provided. The LL-HLS video stream corresponding to a live event is retrieved. The LL-HLS video stream is converted to a LL-DASH video stream. This conversion of the LL-DASH stream from the LL-HLS stream provides reformatting without encoding of the LL-DASH stream.

20 Claims, 6 Drawing Sheets

DYNAMIC CREATION OF LOW LATENCY VIDEO STREAMS IN A LIVE EVENT

CROSS REFERENCE

This application claims benefit of U.S. Provisional Application No. 63/261,094 by Zhang et al., filed Sep. 10, 2021, entitled "DYNAMIC CREATION OF LOW LATENCY VIDEO STREAMS IN A LIVE EVENT," the disclosure which is incorporated by reference herein in its entirety.

BACKGROUND

This disclosure relates in general to live video streaming and, but not by way of limitation, creating low latency video streams for the live video streaming in a live event.

Live streaming is used to deliver live experiences of events occurring in public places to a plurality of users present at various places. The live content is typically delivered to a server which then transmits the content to different users for playing the live content on their respective user devices. The devices available with the users may use different streaming formats for receiving and playing the video streams. Such streaming formats include Hypertext Transfer Protocol (HTTP) live streaming (HLS) format or Dynamic Adaptive Streaming over HTTP (DASH) format. Low Latency HLS (LL-HLS) and Low Latency DASH (LL-DASH) are recently introduced extensions of HLS and DASH formats respectively. They enable lower latency live streaming. The rendering of videos on user devices entails processing the video in either HLS format or DASH format. However, some existing devices can only receive and process HLS (or LL-HLS) streams, while others can only receive and process DASH (or LL-DASH) streams. Hence to reach a population of all receiving devices, the pipeline for creating streaming content must generate streams in both formats.

SUMMARY

Further areas of applicability of the present disclosure will become apparent from the detailed description provided hereinafter. It should be understood that the detailed description and specific examples while indicating various embodiments, are intended for purposes of illustration only and are not intended to necessarily limit the scope of the disclosure.

In one embodiment, the present disclosure provides a method for creating a low latency DASH (LL-DASH) video stream from a Low latency HLS video stream (LL-HLS) is provided. The LL-HLS video stream is obtained from a live video stream captured from a live event. The LL-HLS stream uses a first manifest file which contains the information describing the LL-HLS stream. From the LL-HLS stream, the LL-DASH stream is obtained by converting the first manifest file into a second manifest file. This conversion of LL-DASH stream from the LL-HLS stream provides reformatting without encoding of the LL-DASH file.

In one embodiment, a method for creating low latency video streams for a live event is provided. The method comprises retrieving a first low latency video stream corresponding to a live event. The first low latency video stream uses a low-latency HTTP live streaming (LL-HLS) and comprises a first plurality of video chunk files. The method further comprises converting the first low-latency video stream into a second low-latency video stream, where the second low-latency video stream uses a low-latency Dynamic Adaptive Streaming over HTTP (LL-DASH). The conversion of the LL-HLS to LL-DASH comprises reformatting without reencoding the first plurality of video chunk files into a second plurality of video chunk files.

In yet another embodiment, a system for creating a low latency video streams for a live event is provided. The system comprises a low-latency HLS converter configured to retrieve a first low-latency video stream corresponding to a live event. The first low-latency video stream uses a low-latency HTTP live streaming (LL-HLS), and comprises a first plurality of video chunk files. The system further comprises a LL-HLS to LL-DASH converter configured to convert the first low-latency video stream into a second low-latency video stream, wherein the second low-latency video stream uses a low-latency Dynamic Adaptive Streaming over HTTP (LL-DASH) and the conversion comprises reformatting without reencoding the first plurality of video chunk files into a second plurality of video chunk files.

A non-transitory computer-readable medium having instructions embedded thereon for creating low latency video streams for a live event, wherein the instructions, when executed by one or more computers, cause the one or more computers to:
  retrieve a first low latency video stream, wherein the first low latency video stream uses a Low-Latency HTTP Live Streaming (LL-HLS), and comprises a first plurality of video chunk files;
  convert the first low latency video stream into a second low latency video stream, wherein the second low latency video stream uses a Low-Latency Dynamic Adaptive Streaming over HTTP (LL-DASH),
  the conversion of LL-HLS to LL-DASH comprises reformatting without reencoding the first plurality of video chunk files into a second plurality of video chunk files using the second manifest file.

BRIEF DESCRIPTION OF THE DRAWINGS

The present disclosure is described in conjunction with the appended FIGURES.

In the appended FIGURES, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
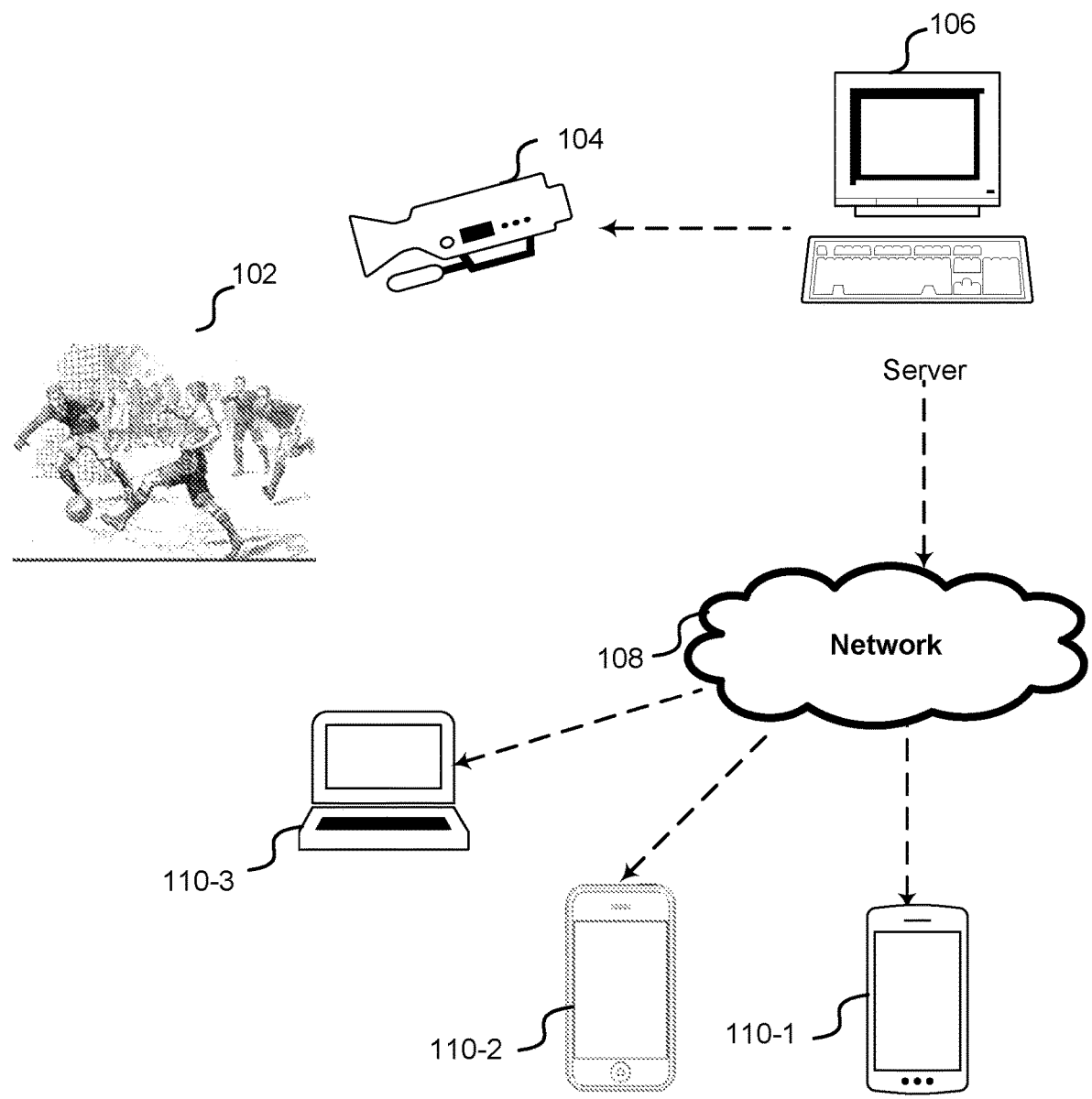
FIG. 1 illustrates an exemplary embodiment describing rendering of live video stream to a plurality of user devices, in accordance with one embodiment of the present disclosure.

In one embodiment, the present invention proposes a method for creating streams in both LL-HLS and LL-DASH formats without doubling the number of content encoding and packaging operations. The invention, therefore, enables almost 2× reduction in the involved Cost of Goods Sold (COGS) compared to straightforward encoding workflow implementations for LL-HLS and LL-DASH streaming Referring to FIG. 1, illustrates an exemplary embodiment describing rendering of live video stream to a plurality of user devices, according to some embodiment of the present disclosure. A live event 102 can be, for example, a sports event. An event capturing apparatus 104 can be used to capture the live event 102. The event capturing apparatus 104 can capture the live event 102 in the form of continuous video streams. The content captured by the event capturing apparatus 104 can include video and audio content. In one embodiment, the captured content can then be compressed by the event capturing apparatus 104 before transmitting it to a server 106. The transmission to the server 106 can be via wireless communication means.

Server 106 then processes the live video stream received from the event capturing apparatus 104. The processing can include converting the live video stream in different formats such that it can be made available to different users using different devices. The server 106 also converts the live video stream in different bitrates such that the users can play the live video stream using the different bitrates.

After processing by the server 106, the live video streams can be rendered on different user devices 110-1, 110-2, 110-3 via a network 108. The user devices 110-2, 110-3 can include smartphones having operating systems such as Apple®, Android®, Windows®, etc. The user device 110-1 can also include other computing devices such as laptops, computers, iPads, etc. The different user devices 110-1, 110-2, 110-3 having different operating systems can use different file formats for playing the live video streams. For example, the user devices 110-1, 110-2, 110-3 can use various video streaming protocols such as HLS, DASH to play the live video streams in the different formats.

Figure 2:
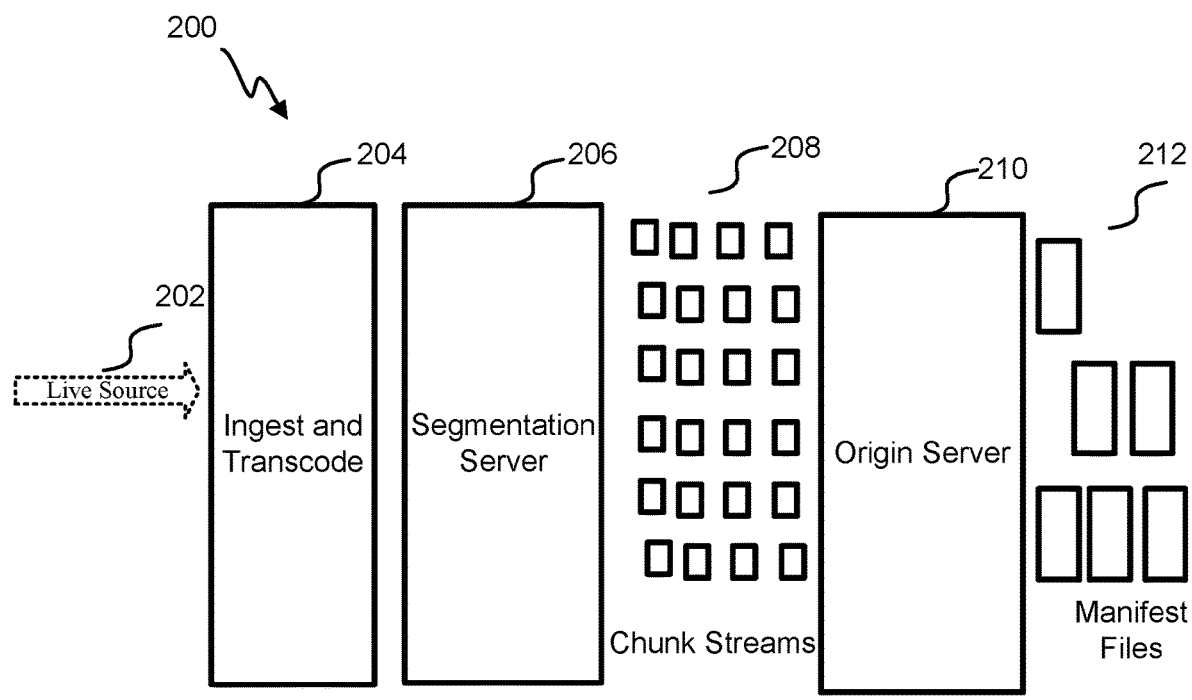
FIG. 2 is a functional block diagram illustrating an example process for ingesting, transcoding, segmentation and adaptive streaming is provided, in accordance with one embodiment of the present disclosure.

Referring now to FIG. 2, a functional block diagram illustrating an example process for ingesting, transcoding, segmenting, and adaptive streaming is provided, in accordance with some embodiment of the present disclosure. The content prepared by and/or delivered from server 106 can be classified as HTTP adaptive streaming. Adaptive streaming (or also referred to as adaptive bitrate (ABR) streaming) operates by dynamically adjusting the play-out rate to stay within the actual network throughput to a given endpoint, lacks the entail for rebuffering. So, if the network throughput suddenly drops, the picture can degrade but an end-user still sees a picture.

Using adaptive streaming technology, during periods of network congestion, operators can set session management policies to permit a predefined level of network over-subscription rather than blocking new sessions (such as when last-mile bandwidth availability is too limited to permit another client to join). This flexibility will become more imperative as subscribers demand higher quality feeds (e.g., 1080p and 4K).

As used herein, HTTP adaptive streaming is the generic term for various implementations: HTTP Live Streaming (HLS) used by devices manufactured by Apple®, Microsoft IIS Smooth Streaming, Adobe HTTP Dynamic Streaming (HDS), and DASH by manufactures apart from Apple® (for example Android).

Although each of the various implementations of HTTP adaptive streaming is different, they have a set of common properties. For example, source content 202 is transcoded in parallel at multiple bit rates (e.g., multi-rate coding) by using an ingest and transcode process 204. The source content 202 can comprise media content such as live source content and/or file source content. For example, the file source content can include movies, TV programs, etc. The live source content can include live streaming, such as a live broadcast of a sports program or game.

The encoded content is divided into fixed duration segments (e.g., chunks) in a segmentation process 206. The segments or chunks are typically between 2 and 10 seconds in duration, although they can be longer or shorter. In some embodiments, shorter segments reduce coding efficiency while larger segments impact speed to adapt to changes in network throughput.

A manifest file is created and updated as necessary to describe the encoding rates and URL pointers to segments in a manifest file creation process 212. As used herein, a manifest file or playlist describes how content is prepared, how many different encoding bitrates, and for each bitrate stream, how long a segment is, and where to obtain each segment of each bitrate stream.

In some embodiments, the client uses HTTP to fetch segments from the network, buffer them and then decode and play them. The client can utilize one or more algorithms designed to select the optimum profile to maximize quality lacks risking buffer underflow and stalling (e.g., rebuffering) of the play-out. For example, each time the client fetches a segment, it can choose the profile based on the measured time to segment.

Figure 3:
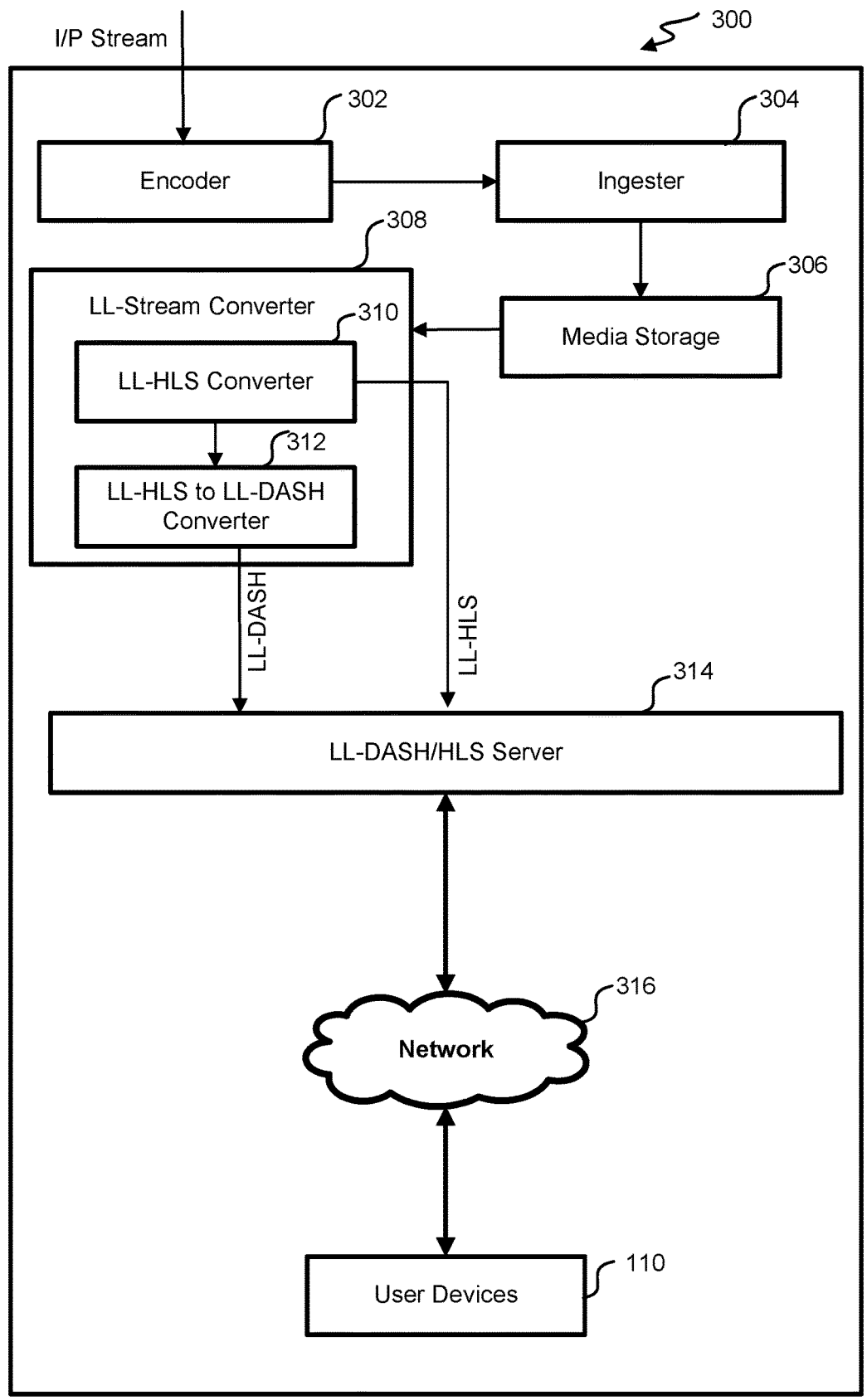
FIG. 3 illustrates a block diagram of low-latency video stream creation system, in accordance with one embodiment of the present disclosure.

Referring now to FIG. 3, a block diagram of low-latency video stream creation system 300 is shown, in accordance with some embodiment of the present disclosure. The system 300 comprises an encoder 302, an Ingester 304, a media storage 306, a low latency (LL)-stream converter 308a LL-HLS converter 310, a LL-HLS to LL-DASH converter 312, a LL-DASH/HLS server 314, a network 316 and plurality of user devices 110.

The encoder 302 receives video streams from a live event and generates streams that can be transmitted to the Ingester 304. In one embodiment, the encoder 302 can receive continuous audio and video streams which are further divided into a plurality of chunks. In another embodiment, the encoder 302 can directly receive the plurality of chunks of the video streams. The plurality of chunks of the video streams can be continuous streams containing audio and video.

The encoder 302 compresses the received video stream into a format that can be easily transmitted. For example, the encoder 302 can compress the video stream using one or more protocols, such as H.264 compression technique. The compression of video saves bandwidth during transmission of the video stream.

The encoder 302 transmits the video stream to the Ingester 304 in a format such as Secure Reliable Transport (SRT), Real-Time Streaming Protocol (RTSP), or Real-Time Messaging Protocol (RTMP) protocols. The Ingester 304 processes the input stream and saves the output in the media storage 306 in a format, for example, Common Media Application Format (CMAF) segments or fragmented MPEG-4 Part 14 (MP4) segments. The Ingester 304 acts as an intermediate to deliver the encoded video content from the encoder 302 to the media storage 306.

The LL-stream converter 308 reads the content stored in the media storage 306 and converts the content into low-latency HTTP live streaming (LL-HLS). In particular, the LL-stream converter 308 comprises a Low latency-HLS (LL-HLS) converter 310 and a Low latency-HLS converter to Low latency-DASH (LL-DASH) converter (or LL-HLS to LL-DASH converter) 312. Thus, the stored content from the media storage 306 is converted into a LL-HLS streams by the LL-HLS converter 310. The LL-HLS streams use a first manifest file (or a first metadata file) called m3u8 file. The m3u8 file contains the elements entailed for generating the LL-HLS streams. In other words, the m3u8 file describes the LL-HLS video stream. The m3u8 file is a metadata file that contains information about various playback formats. The m3u8 file of a LL-HLS stream contains most of the information entailed for converting the LL-HLS stream into a LL-DASH stream. Specifically, the conversion can be done by converting the m3u8 file of the LL-HLS stream to a metadata file, called the Media Presentation Description (MPD) file for the LL-DASH stream.

The m3u8 file comprises various elements which can be reused for generating the LL-DASH file. Some of the elements which are not present in the m3u8 file are added in the mpd file separately for generating the LL-DASH file. Table 1 below explains various elements used to generate LL-DASH file from LL-HLS file:

TABLE 1

| MPD elements | Value | comments |
| --- | --- | --- |
| @profiles | "urn:mpeg:dash:profile:isoff-live:2011" | This is a common value for LL-DASH streams. |
| @type | "dynamic" | This is a common value for LL-DASH streams. |
| @minimumUpdatePeriod | This is a choice of the service providers. It is irrelevant to the LL-HLS playlists. | This is a DASH specific element, not to be converted from an LL-HLS m3u8 file. |
| @availabilityStartTime | Set to the start wall clock time of this live stream. | This value is known to the service providers, and ought be identical for the LL-HLS and LL-DASH streams. |
| @publishTime | Set to the current time when this manifest is generated. | This value is known to the service providers. |
| @MaxSegmentDuration | Set to the configured segment duration of this stream. | This value is known to the service providers. The same value ought be used for the LL-HLS and LL-DASH streams. |
| @minBufferTime | Set to the configured segment duration of this stream. | This value is known to the service providers. The same value ought be used for the LL-HLS and LL-DASH streams. |
| @availabilityTimeOffset | Set to "segmentDuration - chunkDuration" such that a client can request a segment as soon as its first video chunk is available for download on the server side. | The values of segmentDuration and chunkDuration are known to the service providers. The same values of segmentDuration and chunkDuration ought to be used for the LL-HLS and LL-DASH streams. |
| @availability TimeComplete | Set to false as entailed by LL-DASH specification. | |
| @timeShiftBufferDepth | This is a choice of the service providers. It is irrelevant to the LL-HLS playlists. | |
| @Latencytarget | This is a choice of the service providers. It is irrelevant to the LL-HLS playlists. | |
| @segmentAlignment | This must be set to "true". | |
| @ProducerReferenceTime | ProducerReferenceTime is used to signal a pair of wall clock time wallClockTime and presentation time presentation Time in which the latter is the wall clock time when the video frame with the given presentationTime is generated by the encoder. | The mapping of wallClockTime and presentation Time can be obtained from the encoder. Otherwise, it can also be inferred from EXT-X-PROGRAM-DATE-TIME in the LL-HLS m3u8 file. "inband" must be set to true to signal inband prft box in the media segments. |

TABLE 1-continued

| MPD elements | Value | comments |
| --- | --- | --- |
| @mimeType, @codecs, @bandwidth, @height, @width, @frameRate, @par, | The codec-specific parameters are known to the service providers, there is no need to copy/convert from the LL-HLS m3u8 files. | |
| @period | Period start time is a DASH specific attribute, and it is a choice of the service providers. It is irrelevant to the LL-HLS m3u8. | |
| @timescale and @duration | Duration must match the segment duration used by LL-HLS. Timescale must match the value of duration. | |
| @initilization and @media and @startNumber | The segment naming template for the initialization and media segments and the segment start number must match the segment URL used by LL-HLS, such that the server can properly locate the media segments based on the client's request URL. | |
| @UTCTiming | This is a DASH-specific element. Set to the timing source url. | |

Table 1 explains various MPD elements entailed for generating the LL-DASH file. The MPD elements are second manifest files (or second metadata files) which can be used for generating LL-DASH file from the LL-HLS file. The table also mentions various comments along with each element to explain the necessity of the element in creating the LL-DASH file and to explain whether the element is taken from the LL-HLS file or added separately.

For example, the elements "@profiles" is common to LL-HLS and LL-DASH and hence this element can be extracted from m3u8 file and used in MPD file. Further, the element "@minimumUpdatePeriod" is an element only for LL-DASH file and ought not to be extracted from m3u8 file (LL-HLS).

Additionally, during the conversion process by the LL-HLS to LL-DASH converter 312, a "ProducerReferenceTime (prft)" box must be inserted. This box is entailed for LL-DASH streams to be valid and enable correct playback by the players. It will be ignored by LL-HLS players.

Very imperatively, the video segment sequence numbers and the segment URLs in the MPD must be set correctly for the same set of segments to be shared/reused by LL-HLS and LL-DASH. If they do not match, the streaming server won't be able to find the right segment which a player requests.

When the LL-HLS converter 310 is running and outputting segments and the m3u8 playlist, a separate process dynamic manifest converter is present in the LL-HLS to LL-DASH converter 312, can run concurrently to dynamically convert the m3u8 file to a mpd file (manifest file for LL-DASH). There is no entail to run dynamic manifest converter as a persistent daemon, it is entailed to be run when the initial mpd file is generated or when it needs to be updated. The LL-HLS master m3u8 file and the variant m3u8 file must be converted and combined to generate the single LL-DASH mpd file.

Specifically, on the input side, dynamic manifest converter reads the whole body of the LL-HLS m3u8 files into its memory space, identifies all the relevant LL-HLS tags, and creates a table to store the tag names and tag values. On the output side, dynamic manifest converter creates a text buffer for storing the body of the output LL-DASH mpd file, then generates and outputs the mpd file by referring to the table which stores the LL-HLS tags/values.

Unlike the LL-HLS m3u8 files which are updated constantly when new segments and chunks are added, an LL-DASH mpd file is a static file unless its content is updated sporadically by the service providers. Oftentimes, a sporadic mpd update is caused by a configuration change to the streaming servers. Therefore, dynamic manifest converter runs to create the initial mpd file when a streaming session just starts, or whenever a sporadic mpd update is mandated to signal a configuration change.

In the output mpd file, the MPD level elements and attributes are shared among the renditions (known as representations in DASH). The rendition-specific information contained in the different variant playlists is consolidated to generate the <adaptationSet> element in the mpd file.

In one embodiment, the system 300 comprises a processing unit (not shown). The processing unit is coupled to encoder 302, Ingester 304, media storage 306, and LL-stream converter 308 and helps provide communication between different components present in the system 300. For example, the processing unit helps establish communication between encoder 302 and Ingester 304, Ingester 304 and media storage 306, media storage 306 and LL-stream converter 308.

The LL-HLS stream from the LL-HLS converter 312 is sent to LL-DASH/HLS server 316 and the LL-DASH stream obtained from the LL-HLS to LL-DASH converter 314 is sent to LL-DASH/HLS server 316 which can then send the LL-DASH stream for playback to the user devices 110-1, 110-2, 110-3 via the network 318. The LL-DASH/HLS server 316 must be running to serve the LL-DASH mpd file and the media segments. When the user device 110-1 requests the LL-DASH mpd file, and server 316 does not have it stored anywhere, server 316 shall generate the mpd file for the first time and respond to the client. Otherwise, server 316 shall read the stored copy of the mpd file, modify the element "@publishTime" element, then respond to the user device 110-1. After serving the mpd file of a stream, the LL-DASH/HLS server 316 shall wait for requests for segments from the clients. The LL-DASH/HLS server 316 shall be able to serve the CMAF initialization and media segments properly as if they are generated originally for LL-DASH streaming.

In one embodiment, the network 318 is a content delivery network (CDN). The CDN is a geographically distributed network of proxy servers and datacenters. The content delivery network provides high availability and performance by distributing the content spatially relative to end user 110-1, 110-2, 110-3.

In one embodiment, the LL-DASH stream can directly be generated from the content stored in media storage 306. In such a case, the LL-DASH file is discarded.

Figure 4:
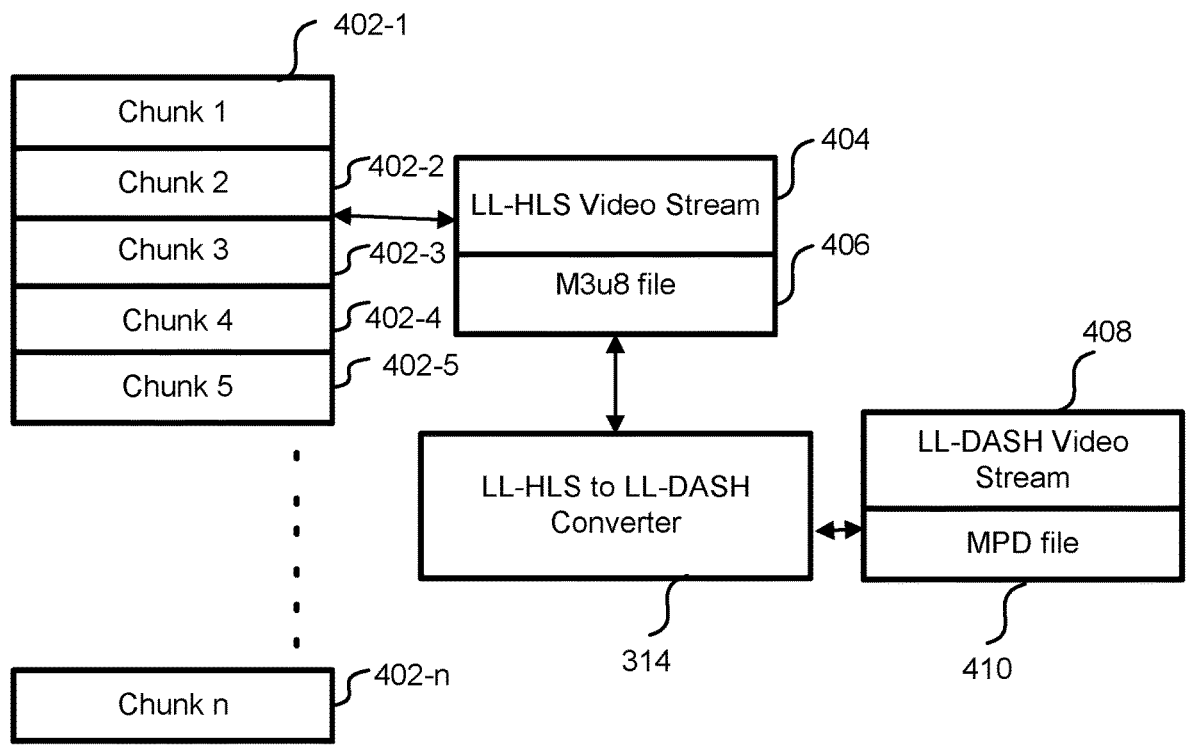
FIG. 4 illustrates a brief overview of conversion of LL-HLS stream into LL-DASH stream, in accordance with one embodiment of the present disclosure.

FIG. 4 describes a brief overview of conversion of LL-HLS stream into LL-DASH stream, in accordance with some embodiment of the present disclosure. As described above, a plurality of chunks 402 is generated from a live video stream. The plurality of chunks 402 can be labeled as chunk 402-1, chunk 402-2 . . . chunk 402-n. The plurality of chunks 402 is converted into a low latency HLS (LL-HLS) video streams 404 along with a m3u8 file 406 as a metadata file. The LL-HLS file 404 is then fed to LL-HLS to LL-DASH converter 314. The converter 314 transforms the LL-HLS file into LL-DASH 408 file by using the m3u8 file and the mpd file 410. The mpd file 410 is a metadata file for LL-DASH stream and contains the elements (new and common to LL-HLS and LL-DASH file) for generating the LL-DASH file.

In one embodiment, the generated LL-HLS stream is time delayed with respect to the plurality of chunks. The time delay can be of between 3-10 seconds. Also, the converted LL-DASH stream can further be time-delayed with respect to the LL-HLS stream. The time delay is a delay between capturing the live event and rendering the content on the user devices 110-1, 110-2, 110-3.

Figure 5:
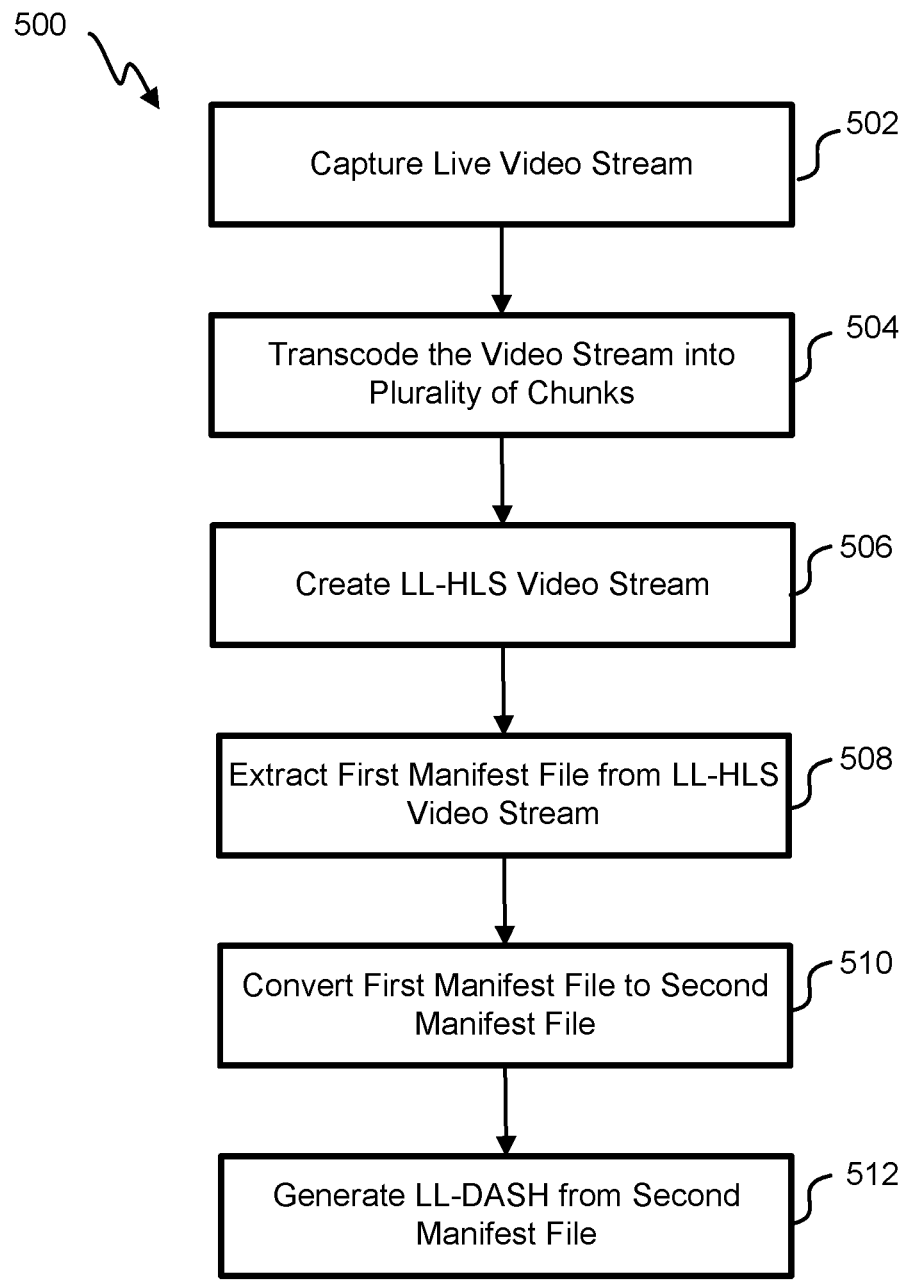
FIG. 5 illustrates flowchart describing a method for generating a low-latency video streams, in accordance with one embodiment of the present disclosure.

FIG. 5 describes a method 500 for generating low-latency video streams, in accordance with some embodiment of the present disclosure. A live video stream is captured from a live event, transcoded, and incrementally outputted in a sequence of chunks. The plurality of chunks can be formed so that the video streams captured from the live event can be transmitted to one or more servers via a network. The plurality of transcoded video chunks is subsequently converted into a Low Latency HLS stream (a first low latency video stream) and a Low Latency DASH stream (a second low latency video stream). The separate LL-HLS and LL-DASH streams are generated so that they can be used for different devices for playback. This generation of separate streams entails duplication in the processing of the generation of LL-HLS and LL-DASH streams. The present disclosure provides reformatting of the LL-DASH streams without reencoding of a first plurality of video chunk files (obtained from LL-HLS stream) into a second plurality of video files.

Method 500 begins at block 502, where the live video stream is captured from the live event. The live video stream can be captured by the event capturing apparatus 104. The live video stream can include a video and an audio captured in the live event.

Once the live video stream is captured, method 500 proceeds at block 504, where the live video stream is incrementally encoded into a plurality of chunks. The plurality of chunks of video streams are generated such that the live video stream can be incrementally transmitted to server 106 for playback at the user devices 110-1, 110-2, 110-3. Incremental or "chunk-based" transmission of such chunks is needed to ensure low delay. The plurality of chunks of video streams can be continuous video streams.

From the plurality of chunks of video streams, a Low Latency HLS video stream is generated, at block 506. The process of creation of LL-HLS stream may include repackaging or re-muxing of the encoded video chunks into final format used for LL-HLS delivery (e.g. fragmented MP4 or CMAF), and generation of the associated LL-HLS manifest file.

Once the LL-HLS stream is created, at block 508, a first manifest file or a first metadata file is used by the LL-HLS file. The first manifest file or the first metadata file can be a m3u8 file. The first manifest file comprises elements or attributes present in the LL-HLS file. The elements or attributes can be elements as mentioned in the table 1 above. As shown in the table 1, the elements or attributes present in the m3u8 file comprise information that can be later used to convert the LL-HLS stream to LL-DASH stream.

At block 510, the m3u8 file is converted into a second manifest file or a second metadata file which can then be used to generate the LL-DASH file. The common elements from the m3u8 file are identified and added to mpd file. Also, the elements which are not common between the m3u8 file and the mpd file but are necessary to generate the LL-DASH file is identified and added in the mpd file. Hence, the mpd file is generated which is further used to generate the LL-DASH file at block 512.

In one embodiment, the generation of the first manifest file and hence the second manifest file may be omitted. In that case, the LL-DASH stream can directly be obtained from the LL-HLS file without creating the first manifest file.

Figure 6:
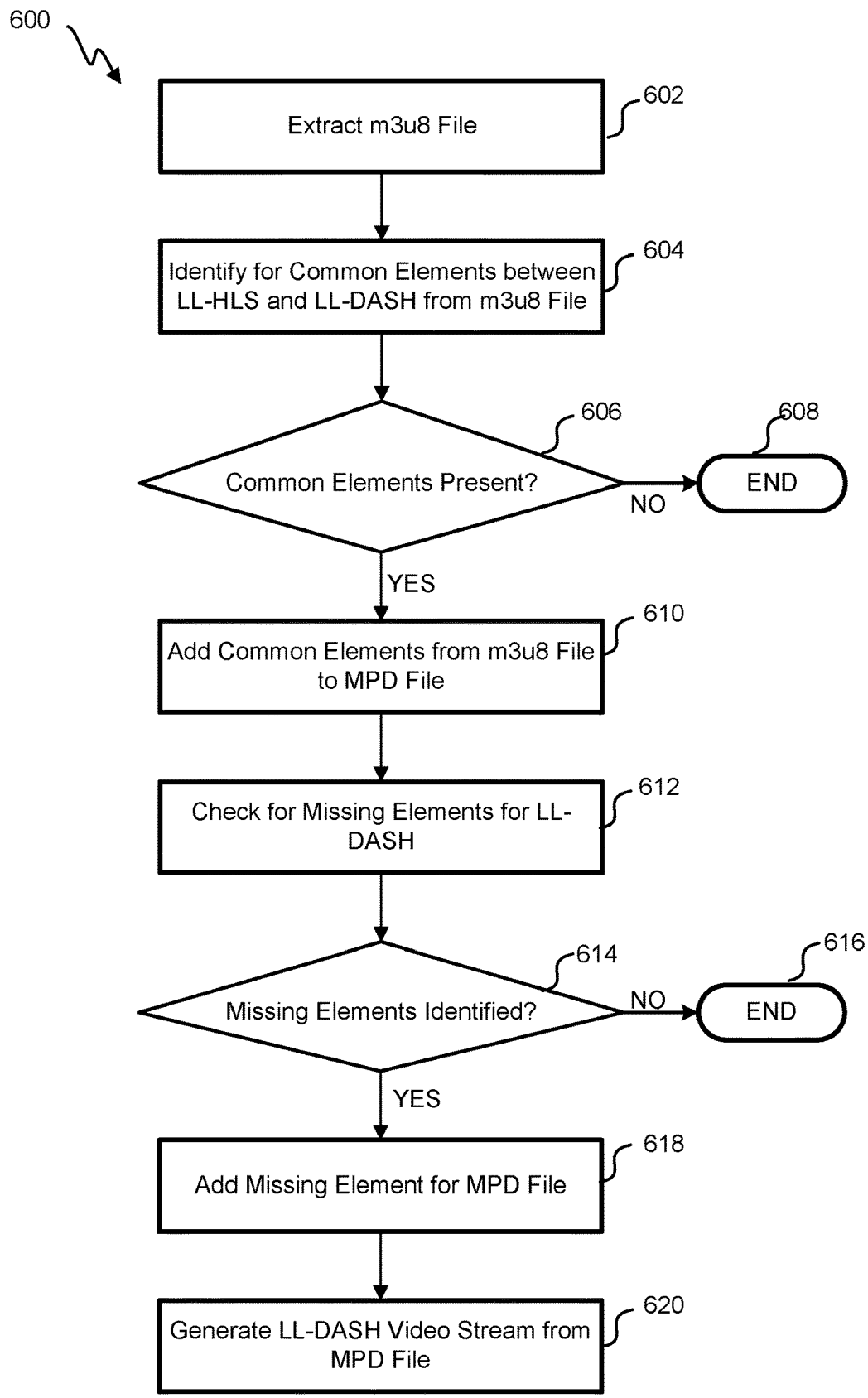
FIG. 6 illustrates a flow diagram describing a method for converting a LL-HLS stream into a LL-DASH stream, in accordance with one embodiment of the present disclosure.

Referring to FIG. 6 now, a method 600 for converting a LL-HLS stream into a LL-DASH stream. At block 602, the m3u8 file is fetched. As mentioned above, the m3u8 file is called a first metadata file or a first manifest file. In one embodiment, the m3u8 file can be present in a memory of a server 106. In another embodiment, the m3u8 file can be extracted from the LL-HLS stream. From the m3u8 file, at block 604, elements common between the LL-HLS and the LL-DASH streams are identified. In particular, elements common between the first manifest file (or m3u8 file) and the second manifest file (or mpd file) are identified. If, at block 606, it is identified that common elements are present between the LL-HLS stream and the LL-DASH stream, common elements from LL-HLS stream are added to mpd file, at block 610. If, however, no elements are found to be missing from LL-HLS stream, it can be indicated that LL-DASH file can not be generated from LL-HLS file and the method 600 ends (at block 608).

The method 600 then proceeds to block 612, it is identified if there are missing elements in the LL-DASH stream which are necessary for the generation of the LL-DASH stream. If the missing elements are identified, at block 614, the missing elements are added to the mpd file, at block 618. If, however, no missing elements are found, the method 600 ends at block 616. Finally, at block 620, the LL-DASH stream is generated from the mpd file obtained at block 618.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A method for creating low latency video streams corresponding to a live event, the method comprising:
   retrieving a first low-latency video stream corresponding to the live event, wherein:
      the first low-latency video stream uses a low-latency HTTP live streaming (LL-HLS); and
      the first low-latency video stream comprises a first plurality of video chunk files;
   converting the first low-latency video stream into a second low-latency video stream, wherein:
      the second low-latency video stream uses a low-latency Dynamic Adaptive Streaming over HTTP (LL-DASH);
      the converting the first low-latency video stream into a second low-latency video stream comprises:
         reformatting without reencoding the first plurality of video chunk files into a second plurality of video chunk files.

2. The method for creating low latency video streams for a live event, as recited in claim 1, wherein the first low-latency video stream and the second low-latency video stream indicate a delay between receiving the first low latency video stream and the second low-latency video stream and rendering the low latency video streams on a user device.

3. The method for creating low latency video streams for a live event, as recited in claim 1, wherein the first low-latency video stream comprises a first manifest file and the second low-latency video stream comprises a second manifest file.

4. The method for creating low latency video streams for a live event, as recited in claim 1, wherein the LL-HLS stream is used by a plurality of user devices.

5. The method for creating low latency video streams for a live event, as recited in claim 3, wherein the LL-HLS stream uses the first manifest file called m3u8 file.

6. The method for creating low latency video streams for a live event, as recited in claim 5, wherein the m3u8 file describes the LL-HLS stream.

7. A system for creating a low latency video streams for a live event, the system comprising:
   a low-latency HLS converter configured to retrieve a first low-latency video stream corresponding to the live event, wherein:
      the first low-latency video stream uses a low-latency HTTP live (streaming (LL-HLS) format; and
      the first low-latency video stream comprises a first plurality of video chunk files; and
   a LL-HLS to LL-DASH converter configured to convert the first low-latency video stream into a second low-latency video stream, wherein:
      the second low-latency video stream uses a low-latency Dynamic Adaptive Streaming over HTTP (LL-DASH) stream;
      the converting the first low-latency video stream into a second low-latency video stream comprises:
         reformatting without reencoding the first plurality of video chunk files into a second plurality of video chunk files.

8. The system for creating low-latency video streams for the live event, as recited in claim 7, wherein the first low-latency video stream and the second low-latency video stream indicate a delay between receiving the first low-latency video stream and the second low-latency video stream and rendering the low-latency video streams on a user device.

9. The system for creating low-latency video streams for a live event, as recited in claim 7, wherein the first low-latency video stream comprises a first manifest file and the second low-latency video stream comprises a second manifest file.

10. The system for creating low-latency video streams for the live event, as recited in claim 7, wherein the LL-HLS stream is used by a plurality of user devices.

11. The system for creating low latency video streams for the live event, as recited in claim 9, wherein the LL-HLS stream uses the first manifest file called m3u8 file.

12. The system for creating low latency video streams for the live event, as recited in claim 11, wherein the m3u8 file describes the LL-HLS stream.

13. The system for creating low latency video streams for the live event, as recited in claim 12, wherein the conversion is performed by converting the m3u8 file of the LL-HLS stream to a metadata file, called the Media Presentation Description (MPD) file for the LL-DASH stream.

14. A non-transitory computer-readable medium having instructions embedded thereon for creating low latency video streams for a live event, wherein the instructions, when executed by one or more computers, cause the one or more computers to:
   retrieving a first low-latency video stream corresponding to the live event, wherein:
      the first low-latency video stream uses a low-latency HTTP live streaming (LL-HLS); and
      the first low-latency video stream comprises a first plurality of video chunk files;
   convert the first low-latency video stream into a second low-latency video stream, wherein:
      the second low-latency video stream uses a low-latency Dynamic Adaptive Streaming over HTTP (LL-DASH) stream;
      the converting the first low-latency video stream into the second low-latency video stream comprises:
         reformatting without reencoding the first plurality of video chunk files into a second plurality of video chunk files.

15. The non-transitory computer-readable medium as recited in claim 14, wherein the first low-latency video stream and the second low-latency video stream indicate a delay between receiving the first low-latency video stream and the second low-latency video stream and rendering the low latency video streams on a user device.

16. The non-transitory computer-readable medium as recited in claim 14, wherein the first low-latency video stream comprises a first manifest file and the second low-latency video stream comprises a second manifest file.

17. The non-transitory computer-readable medium as recited in claim 14, wherein the LL-HLS stream is used by a plurality of user devices.

18. The non-transitory computer-readable medium as recited in claim 16, wherein the LL-HLS stream uses the first manifest file called m3u8 file.

19. The non-transitory computer-readable medium as recited in claim 18, wherein the m3u8 file describes the LL-HLS stream.

20. The non-transitory computer-readable medium as recited in claim 19, wherein the conversion is performed by converting the m3u8 file of the LL-HLS stream to a metadata file, called the Media Presentation Description (MPD) file for the LL-DASH stream.

\* \* \* \* \*